United States Patent
Felt et al.

(10) Patent No.: US 10,176,611 B2
(45) Date of Patent: Jan. 8, 2019

(54) LAYER-BASED IMAGE UPDATES

(71) Applicant: Cellco Partnership, Basking Ridge, NJ (US)

(72) Inventors: Michelle Felt, Randolph, NJ (US); Jonghoon Kim, Jersey City, NJ (US); Shruti Valunjkar, West Windsor, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 791 days.

(21) Appl. No.: 14/058,758

(22) Filed: Oct. 21, 2013

(65) Prior Publication Data

US 2015/0113441 A1    Apr. 23, 2015

(51) Int. Cl.
*G06T 11/60* (2006.01)
*G06F 3/0484* (2013.01)
*H04L 29/06* (2006.01)
*H04N 21/472* (2011.01)

(52) U.S. Cl.
CPC ............ *G06T 11/60* (2013.01); *G06F 3/0484* (2013.01); *H04L 65/602* (2013.01); *H04N 21/47205* (2013.01)

(58) Field of Classification Search
CPC ... G06T 11/60; H04L 65/403; H04L 65/4038; H04L 65/4046; H04L 65/4053; G06Q 10/10; G06Q 10/101; G06Q 10/103; H04N 7/15; G06F 3/0482; G06F 3/04842; G06F 3/048; G06F 3/0484; G06F 3/04845; G06F 17/24; G06F 17/241
See application file for complete search history.

(56) References Cited

U.S. PATENT DOCUMENTS

| | | | | |
|---|---|---|---|---|
| 5,107,443 A | * | 4/1992 | Smith | G06Q 10/10 713/166 |
| 5,692,141 A | * | 11/1997 | Kamisango | G06Q 10/10 707/999.008 |
| 5,996,002 A | * | 11/1999 | Katsurabayashi | G06F 3/1454 709/204 |
| 6,342,906 B1 | * | 1/2002 | Kumar | G06F 3/1454 709/201 |
| 6,463,460 B1 | * | 10/2002 | Simonoff | G06F 3/033 709/203 |
| 7,134,088 B2 | * | 11/2006 | Larsen | G09B 9/003 715/713 |
| 8,130,238 B2 | * | 3/2012 | Distler | G06T 15/04 345/619 |
| 9,037,983 B1 | * | 5/2015 | Shmulevich | G06F 3/048 715/760 |
| 2002/0002602 A1 | * | 1/2002 | Vange | G06F 9/5027 709/219 |
| 2002/0077985 A1 | * | 6/2002 | Kobata | G06F 21/10 705/51 |

(Continued)

*Primary Examiner* — Amy Ng
*Assistant Examiner* — William Wong

(57) ABSTRACT

A system for layered-based image updates is disclosed. In the system, a server may receive information corresponding to a modification to an image made by a user; generate a layer that includes the modification to the image; store the layer; and publish the image as an updated image, including the layer, to cause a user device to display the updated image, information identifying the user, and an indication that the user is associated with the layer.

20 Claims, 10 Drawing Sheets

(56) References Cited

U.S. PATENT DOCUMENTS

| | | | | |
|---|---|---|---|---|
| 2002/0113784 | A1* | 8/2002 | Feilmeier | G06F 1/1626 345/419 |
| 2003/0105734 | A1* | 6/2003 | Hitchen | G06F 21/10 |
| 2003/0105950 | A1* | 6/2003 | Hirano | G06F 21/6218 713/100 |
| 2003/0179214 | A1* | 9/2003 | Saund | G06T 11/60 345/619 |
| 2004/0085354 | A1* | 5/2004 | Massand | G06F 17/2229 715/751 |
| 2004/0225988 | A1* | 11/2004 | Petunin | G06F 17/5068 716/119 |
| 2006/0282819 | A1* | 12/2006 | Graham | G06F 17/241 717/113 |
| 2007/0050340 | A1* | 3/2007 | von Kaenel | G06F 17/30241 |
| 2007/0156670 | A1* | 7/2007 | Lim | G06F 21/6218 |
| 2007/0198534 | A1* | 8/2007 | Hon | G06F 17/30058 |
| 2007/0208994 | A1* | 9/2007 | Reddel | G06F 17/2288 715/205 |
| 2008/0059473 | A1* | 3/2008 | Yamaguchi | G06F 21/6209 |
| 2009/0132907 | A1* | 5/2009 | Shao | G06F 17/2247 715/234 |
| 2009/0199090 | A1* | 8/2009 | Poston | G06F 17/30997 715/255 |
| 2009/0265607 | A1* | 10/2009 | Raz | G06F 17/2288 715/233 |
| 2009/0307762 | A1* | 12/2009 | Cudd, Jr. | G06F 17/30882 726/5 |
| 2010/0017727 | A1* | 1/2010 | Offer | G06Q 10/10 715/753 |
| 2010/0094936 | A1* | 4/2010 | Simonen | G06T 19/00 709/204 |
| 2011/0078590 | A1* | 3/2011 | Hao | G06Q 10/06 715/755 |
| 2012/0231441 | A1* | 9/2012 | Parthasarathy | G09B 7/02 434/362 |
| 2012/0284646 | A1* | 11/2012 | Sitrick | G06Q 10/10 715/753 |
| 2013/0124980 | A1* | 5/2013 | Hudson | G06F 17/21 715/243 |
| 2013/0236119 | A1* | 9/2013 | Campbell | G06T 11/60 382/284 |
| 2013/0318465 | A1* | 11/2013 | Cheng | G06F 3/0483 715/776 |
| 2014/0164901 | A1* | 6/2014 | McDowell | G06F 17/30014 715/233 |
| 2014/0281875 | A1* | 9/2014 | Branton | G06F 17/241 715/230 |

* cited by examiner

Image Sharing Instructions
410

| Image | Owner | Sharing Mode | Modifying Users |
|---|---|---|---|
| Image 1.jpg | Owner 1 | Real-time | User 1, User 2, User 3 |
| Image 2.jpg | Owner 1 | Real-time | User 1, User 3 |
| Image 3.jpg | Owner 1 | Single-user | User 1, User 2, User 4 |
| Image 4.jpg | Owner 2 | Real-time | Public |
| Image 5.jpg | Owner 2 | Single-user | User 5, User 7 |

Layer Information
420

Image 1.jpg
Image owner: Owner 1

| Layer | Layer Data | Layer User | Date/Time/Location |
|---|---|---|---|
| 1 | Freehand sketch | User 1 | Date 1, Time 1, Location 1 |
| 2 | Sub-Image | User 1 | Date 2, Time 2, Location 2 |
| 3 | Animation | User 2 | Date 3, Time 3, Location 3 |

LAYER-BASED IMAGE UPDATES

BACKGROUND

Users share images, for example, via sharing platforms, such as electronic photo albums, social networking websites, or the like. Sharing platforms may lack features that encourage interaction between users that share images.

BRIEF DESCRIPTION OF THE DRAWINGS

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may permit users to add/superimpose layers to an image (e.g., a computer file corresponding to the image) in order to modify the image. In some implementations, the layers may be stored by an image storage server, such that the modified image may be shared or further modified by other users. In some implementations, the image storage server may publish the modified image in an electronic photo album, a web album, a web page (e.g., a web page associated with a social networking website), an online classroom/meeting room, an e-mail, a text message, or the like.

Figure 1:
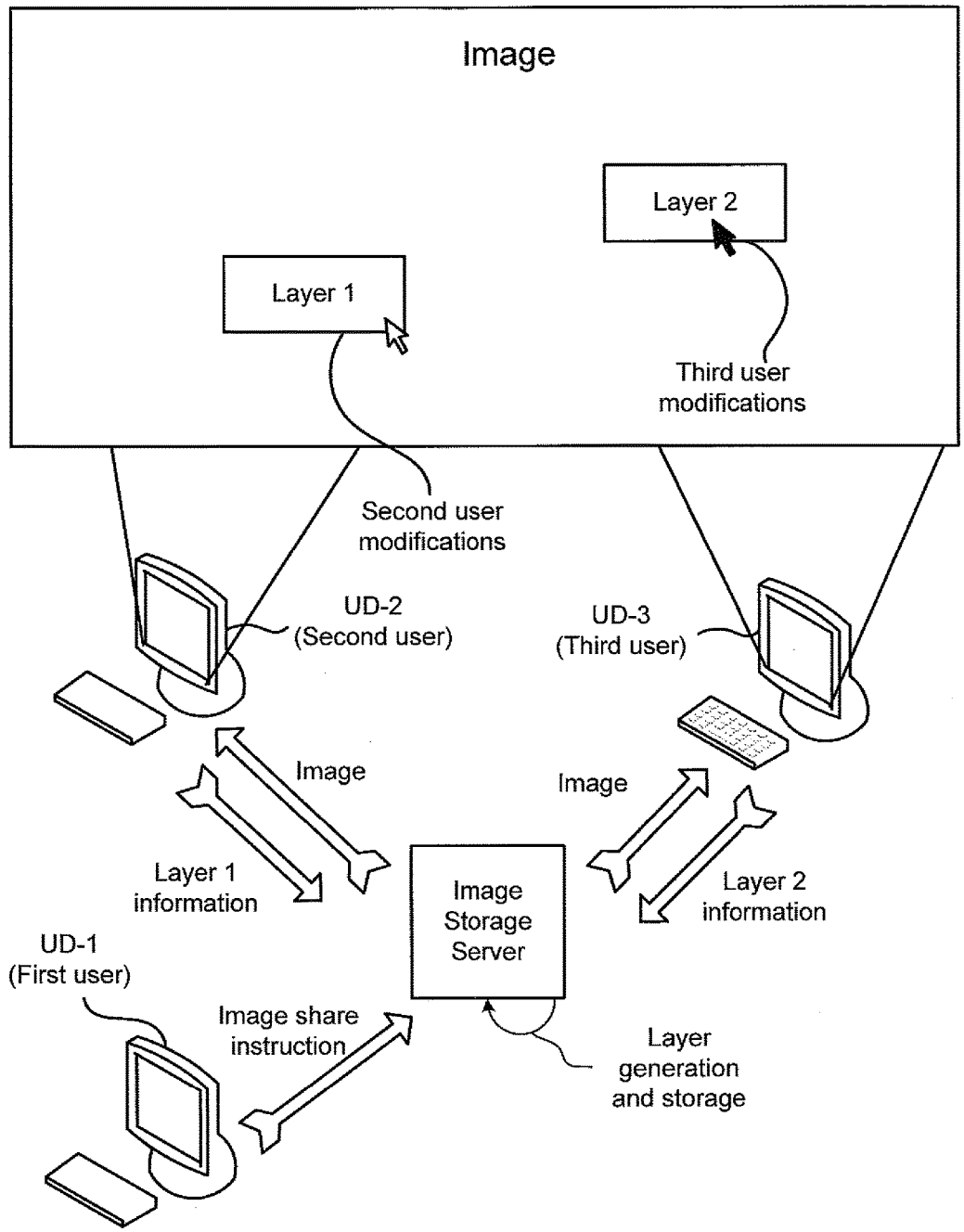
FIG. 1 illustrates an example overview of an implementation described herein.

FIG. 1 illustrates an example overview of an implementation described herein. As shown in FIG. 1, a first user device (e.g., UD-1), associated with a first user, may provide an image share instruction to an image storage server. In some implementations, the image share instruction may include a particular image (e.g., a computer file corresponding to the image), information identifying one or more users that may be permitted to modify the image, information identifying an owner of the image (e.g., the first user), and a sharing mode (e.g., a real-time sharing mode where multiple users may simultaneously modify an image, or a single-user sharing mode where multiple users may modify separate instances of the image).

In some implementations, a second user device (e.g., UD-2), associated with a second user, may access the image from the image storage server. For example, UD-2 may provide information identifying the second user (e.g., login credentials, or the like) to the image storage server. Based on receiving the information identifying the second user and determining that the second user is authorized to modify the image (e.g., based on information identifying users that are authorized to modify the image), the image storage server may provide access to the image to the second user (e.g., as part of a web page associated with a social networking account of the second user or presented in some other format). In some implementations, the second user (e.g., using UD-2) may modify the image (e.g., sketch a freehand drawing over the image using a drawing tool presented on the web page, insert another image (e.g., a sub-image), insert an animation, insert a sound, or the like). In some implementations, UD-2 may provide layer information (e.g., layer 1 information), corresponding to the modifications to the image made by the second user. In some implementations, the image storage server may generate a first layer (e.g., layer 1) based on receiving layer 1 information.

As further shown in FIG. 1, a third user device (e.g., UD-3), associated with a third user, may access the image, modify the image (e.g., corresponding to layer 2), and provide layer 2 information to the image storage server to cause the image storage server to generate a second layer (e.g., layer 2). In some implementations, the second user and the third user may access the image simultaneously to modify the image in an interactive manner (e.g., when the image share instruction specifies a real-time sharing mode), such that modifications made by the second user are visible to the third user in real-time (e.g., as modifications are being made by the second user). Additionally, or alternatively (e.g., when the image share instruction specifies a single-user sharing mode), the second user and the third user may modify the image separately (e.g., access the image at different times, or modify multiple instances of the same image). Thus, each user may be able to build on previous modifications to form a single modified image from different users, or may be able modify a different image so that the modified images are independent of each other.

In some implementations, the first user may hide or delete particular layers. In some implementations, a layer may include attributes that identify a user associated with the layer (e.g., a user that made the modifications corresponding to the layer), a date and/or time in which the modifications were made, a geographic location at which the modifications were made, etc. As a result, multiple users may interact with an image, and modifications to the image may be stored as layers that can be hidden, deleted, or restored without modifying data in the image itself. Further, the layers may identify particular users that made particular modifications.

While FIG. 1 shows UD-2 providing a layer corresponding to modifications made by a second user and UD-3 providing a layer corresponding to modifications made by a third user, in practice, the same user device may be used to provide layers for modifications for different users. For example, different users may use the same user device at separate times to provide different sets of login information and provide different sets of layer information for a particular image to the image storage server.

While the systems and/or methods, described herein, describe layers corresponding to modifications to an image file, the systems and/or methods are not so limited. For example, the layers may correspond to modifications of another type of object, such as an audio file, a video file, a text document, or the like. Also, in some implementations, a layer may be blank and may serve as a placeholder reserved for modifications that may be made by particular users.

Figure 2:
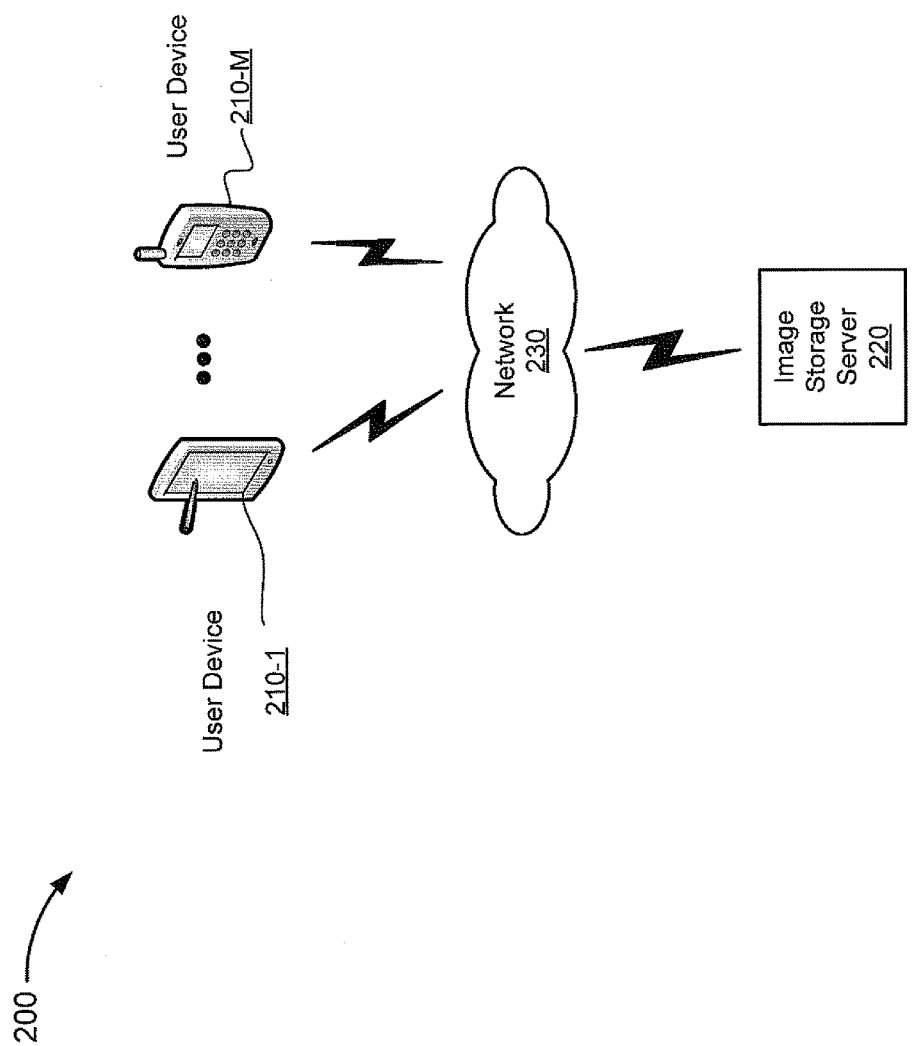
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), image storage server 220, and network 230.

User device 210 may include any device capable of communicating via a network, such as network 230. For example, user device 210 may correspond to a mobile communication device (e.g., a smart phone or a personal digital assistant (PDA)), a portable computer device (e.g., a laptop or a tablet computer), a gaming device, and/or a desktop computing device.

In some implementations, an image owner may instruct user device 210 to provide, to image storage server 220, an image share instruction that includes an image that is to be shared, information identifying users that may access/modify the image, and a sharing mode (e.g., a real-time sharing mode where multiple users may simultaneously modify an image, a single-user sharing mode where multiple users may modify separate instances of the image). For example, the image owner may select the image that is to be shared, the information identifying users that may access/modify the image, and the sharing mode via a user interface of user device 210. In some implementations, user device 210 may access a shared image stored by image storage server 220 and provide layer information that includes one or more modifications to the image (e.g., freehand drawings, a superimposed image/animation, a sound, or the like). Thus, in some implementations, the modifications need not be image-related.

Image storage server 220 may include one or more computing devices, such as a server device or a collection of server devices. In some implementations, image storage server 220 may receive an image that is to be shared (e.g., from an image owner) and may publish the image (e.g., on a web page, such as a web page corresponding to a social networking account of image owner, a web album, or the like). In some implementations, image storage server 220 may receive layer information that includes modifications to the image and layer attributes (e.g., information identifying a user that provided the modifications, a timestamp identifying a time at which the modifications were made, a geographic location tag that identifies a geographic location where the modifications were made, etc.). In some implementations, image storage server 220 may generate and store layers (e.g., based on layer information), and may publish the image with the layers (e.g., in real-time or after receiving a publication instruction from the image owner).

Network 230 may include one or more wired and/or wireless networks. For example, network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2.

Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
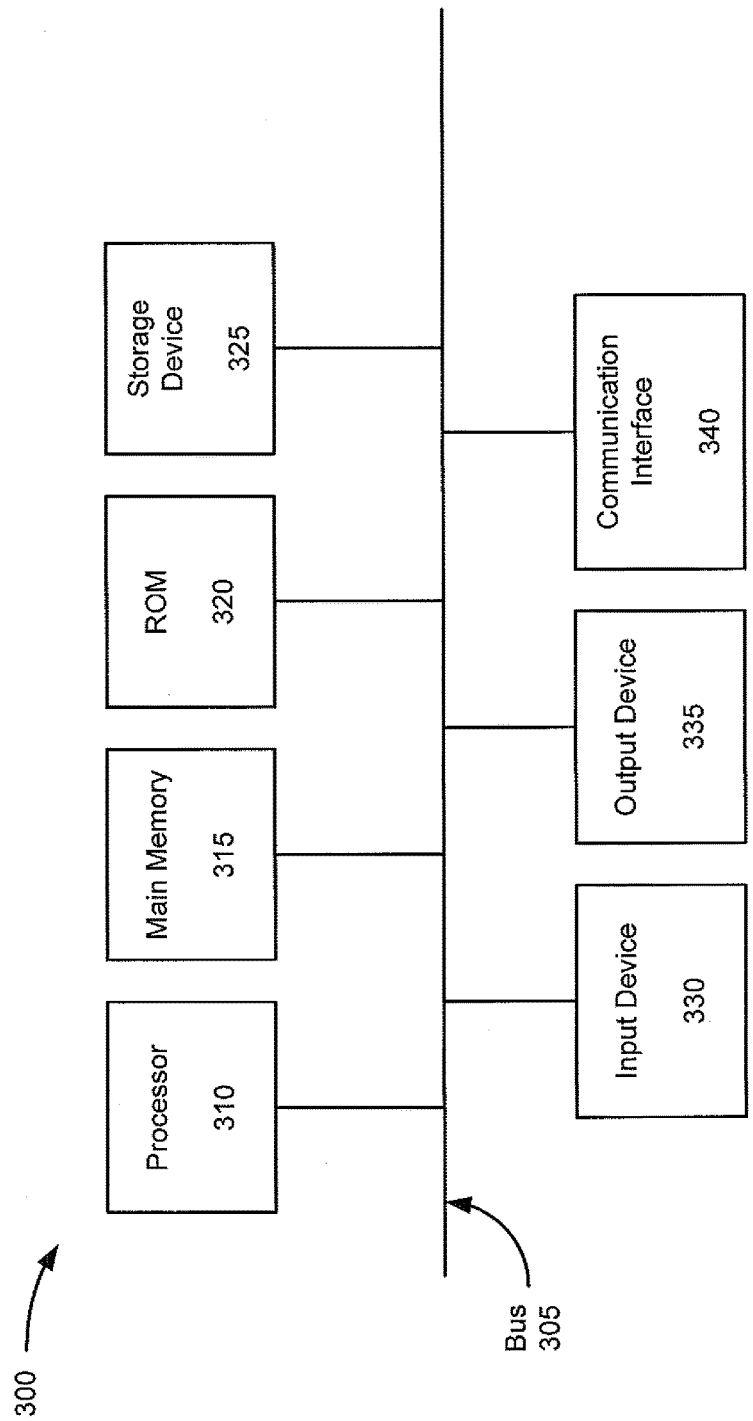
FIG. 3 illustrates example components of a device that may be used within the environment of FIG. 2.

FIG. 3 illustrates example components of a device 300 that may be used within environment 200 of FIG. 2. Device 300 may correspond to user device 210 and/or image storage server 220. Each of user device 210 and/or image storage server 220 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIG. 4 illustrates an example data structure 400 that may be stored by one or more devices in environment 200, such as image storage server 220. In some implementations, data structure 400 may be stored in a memory of image storage server 220. In some implementations, data structure 400 may be stored in a memory separate from, but accessible by, image storage server 220. In some implementations, data structure 400 may be stored by some other device in environment 200, such as user device 210. A particular instance of data structure 400 may contain different information and/or fields than another instance of data structure 400.

As shown in FIG. 4, data structure 400 may include image sharing instructions field 410 and layer information field 420.

Image sharing instructions field 410 may store sharing instructions for one or more images. In some implementations, image sharing instructions field 410 may store an image (e.g., a computer file corresponding to the image or a link to the image), information identifying an owner of the image, a sharing mode for the image (e.g., a real-time sharing mode or a single-user sharing mode), and information identifying modifying users (e.g., users that may modify the image). In some implementations, image sharing instructions field 410 may store information identifying that any user may modify an image (e.g., as indicated by "public" in the modifying users field of image sharing instructions field 410). In some implementations, information stored by image sharing instructions field 410 may correspond to information included in an image sharing instruction received from an image owner via user device 210.

As an example, assume that the image owner (e.g., owner 1) selects (e.g., on a user interface of user device 210) to share a particular image (e.g., image 1.jpg) with user 1, user 2, and user 3 using a real-time sharing mode. Given this assumption, user device 210 may provide (e.g., to image storage server 220) an image sharing instruction including image 1.jpg, information identifying user 1, user 2, and user 3 as modifying users, and information identifying a real-time sharing mode. In some implementations, image sharing instructions field 410 may store the information reflecting the image sharing instruction provided by user device 210.

In some implementations, image sharing instructions field 410 may store some other image sharing instruction, such as information identifying a time period in which the image may be modified. Additionally, or alternatively, image sharing instructions field 410 may identify when a layer, generated by a particular user, may expire and may be automatically deleted by image storage server 220. Additionally, or alternatively, image sharing instructions field 410 may identify image modification techniques that may be permitted to be used to modify an image (e.g., instructions to permit free-hand sketches, sub-image insertion, audio insertion, etc.). Additionally, or alternatively, image sharing instructions field 410 may identify portions of the image that may be modified by particular users. For example, image sharing instructions field 410 may include grid coordinates that correspond to portions of the image that may be modified. Additionally, or alternatively, image sharing instructions field 410 may identify a priority level for each modifying user (e.g., to permit relatively higher priority modifying users to access an image prior to relatively lower priority modifying users).

Layer information field 420 may store information and/or attributes of one or more layers associated with a particular image (e.g., corresponding to modifications made to the particular image). For example, layer information field 420 may store information identifying the particular image (e.g., a computer file name) and information identifying an owner of the image. In some implementations, layer information field 420 may store attributes of a layer, such as layer data, information identifying a layer user, and information identifying a date, time, and/or location. In some implementations, the layer data may include data corresponding to modifications to the particular image, such as data corresponding to a freehand sketch, a sub-image, an animation, a video, an audio track, etc. In some implementations, the information identifying the layer user may identify a particular user that is associated with the layer (e.g., based on a user identifier of a user that generated the layer by modifying the particular image). In some implementations, the information identifying a date, time, and/or location may identify when the layer was generated and a geographic location at which the layer was generated (e.g., based on information provided by a user device 210 used to modify the particular image and generate the layer). For example, user device 210 may provide information identifying the geographic location based on a global positioning system (GPS) device associated with user device 210. Additionally, or alternatively, user device 210 may receive manual input identifying the geographic location. In some implementations, image storage server 220 may identify a geographic location based on a network address (e.g., an internet protocol (IP) address) via which the layer is received.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
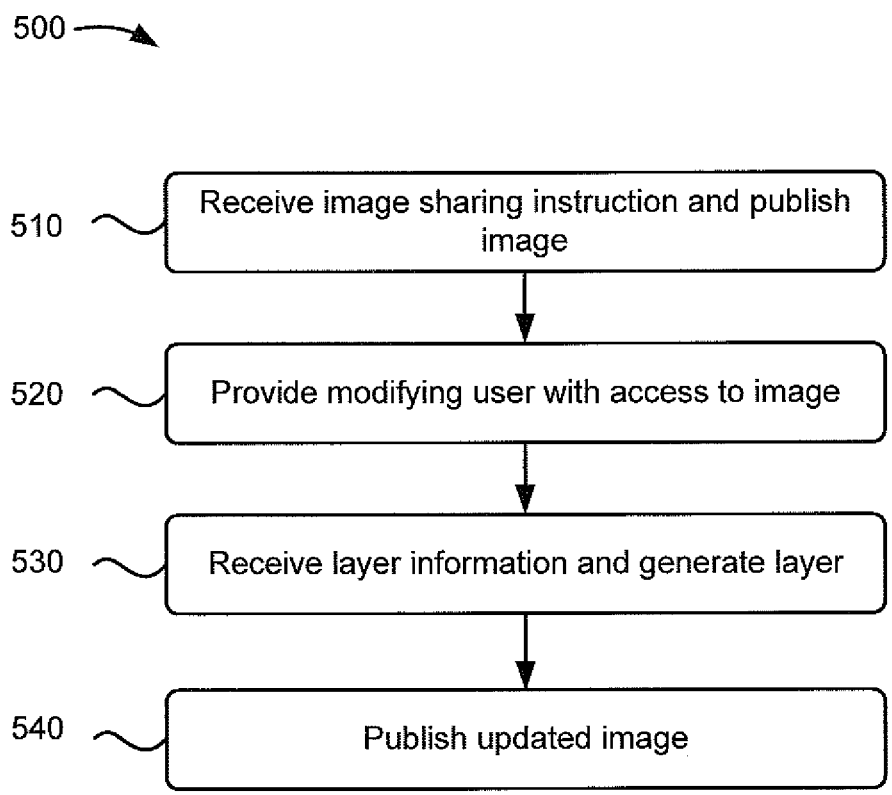
FIG. 5 illustrates a flowchart of an example process for generating a layer and publishing an updated image.

FIG. 5 illustrates a flowchart of an example process 500 for generating a layer and publishing an updated image. In one implementation, process 500 may be performed by one or more components of image storage server 220. In another implementation, some or all of blocks of process 500 may be performed by one or more components of another device in environment 200 (e.g., user device 210), or a group of devices including or excluding image storage server 220.

As shown in FIG. 5, process 500 may include receiving an image sharing instruction and publishing an image (block 510). For example, image storage server 220 may receive an image sharing instruction from an image owner's user device 210 (to be referred to as user device 210-1 in FIG. 5). In some implementations, the image owner may select (e.g., within a user interface of user device 210-1) an image to share, modifying users that may modify the image, a sharing mode, a description of the image, and/or a time period in which the image may be modified. In some implementations, the image owner may select an expiration time associated with layers generated by particular users. For example, the expiration time may identify when a layer, generated by a particular user, may expire and may be automatically deleted by image storage server 220.

In some implementations, the image sharing instruction may include information identifying the image owner, the image, information identifying the modifying users, the sharing mode, the time period in which the image may be modified, and/or the expiration time, as selected by the image owner. In some implementations, image storage server 220 may publish the image to a web page, an electronic photo album, or the like, based on receiving the image sharing instruction. In some implementations, image storage server 220 may store information regarding the image sharing instruction in image sharing instructions field 410.

Process 500 may also include providing a modifying user with access to the image (block 520). For example, image storage server 220 may provide, to a modifying user's user device 210 (to be referred to as user device 210-2 in FIG. 5), access to the image based on receiving a request to access the image and authorizing user device 210-2 to access the image (e.g., based on login credentials that identify the modifying user). In some implementations, image storage server 220 may provide an alert that the image is available to be accessed (e.g., to be viewed and/or modified) when user device 210-2 provides login credentials to access a web page (e.g., a social networking web page for the modifying user, an electronic photo album, or the like). Additionally, or alternatively, the alert may be provided when the image is published. For example, image storage server 220 may provide an e-mail, a short message service (SMS) text message, and/or some other type of message to alert the modifying user that the image is available to be accessed. In some implementations, the alert may identify the image owner, a description of the image provide by the image owner, and/or some other information associated with the image, such as a version of the image (e.g., a thumbnail version, a lower resolution image relative to the original image, etc.). In some implementations, image storage server 220 may provide access to the image within a time period as identified by the image sharing instruction. In some implementations, the time period during which the image may be modified may be displayed on the web page.

In some implementations (e.g., when multiple users simultaneously request access to the image), image storage server 220 may provide access to the same image or to multiple instances of the image. For example, image storage server 220 may provide access to the same image when the image is to be shared in real-time (e.g., based on the sharing mode identified in the image sharing instruction) so that the multiple users may simultaneously modify and view the modifications to the same image in real-time. Alternatively, image storage server 220 may provide access to multiple separate instances of the image when the sharing mode for the image is a single-user sharing mode so that modifications to the images, made by different users, can be later merged.

Process 500 may further include receiving layer information and generating a layer (block 530). For example, image storage server 220 may receive the layer information from user device 210-2. In some implementations, user device 210-2 may form the layer information when receiving a modification to the image (e.g., from the modifying user within a user interface of user device 210-2). For example, user device 210-2 may present options for the modifying user to modify the image by sketching a freehand drawing, inserting text, inserting a sub-image, attaching an audio file, an animation file, a video file, a text file, etc. In some implementations, the layer information may include layer attributes, such as data corresponding to the modification to the image, and/or information identifying a date, time, and/or geographic location at which the modifications were made. In some implementations, image storage server 220 may generate the layer based on the layer information and may store the layer and the layer attributes in layer information field 420.

Process 500 may further include publishing an updated image (block 540). For example, image storage server 220 may publish an updated image based on generating the layer. In some implementations, the updated image may include the layer, corresponding to the modification of the image, superimposed on the image. In some implementations, image storage server 220 may publish the image after receiving an approval instruction from the image owner (e.g., via user device 210-1) to allow the image owner to review the layer and the corresponding modification prior to publishing the updated image. In some implementations, image storage server 220 may publish the image in real-time as the layer is received. In some implementations, the updated image may include information identifying the layer attributes (e.g., information identifying the modifying user, and a date, time, and/or geographic location in which the modification to the image was made).

In some implementations, image storage server 220 may generate multiple layers based on receiving multiple sets of layer information from a single user or multiple users (e.g., via multiple user devices 210-2). In some implementations, the image owner may select to show, hide, or delete particular layers. In some implementations, the image owner may select to merge multiple layers. In some implementations, the image owner may select to enable/disable particular users from modifying the image (e.g., generating layers). In some implementations, image storage server 220 may publish an updated image that reflects the image owner's selection to show, hide, delete, or merge layers. In some implementations, image storage server 220 may publish the updated image on a web page, an electronic photo album, an interactive chat room, an online classroom/meeting room, or the like.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel. Also, while user device 210-1 is described as an image owner's user device 210 and user device 210-2 is described as a modifying user's user device 210, in practice, the same user device 210 may be used by the image owner (e.g., to provide an image share instruction) and by the modifying user (e.g., to modify an image and generate layer information).

Figure 6A:
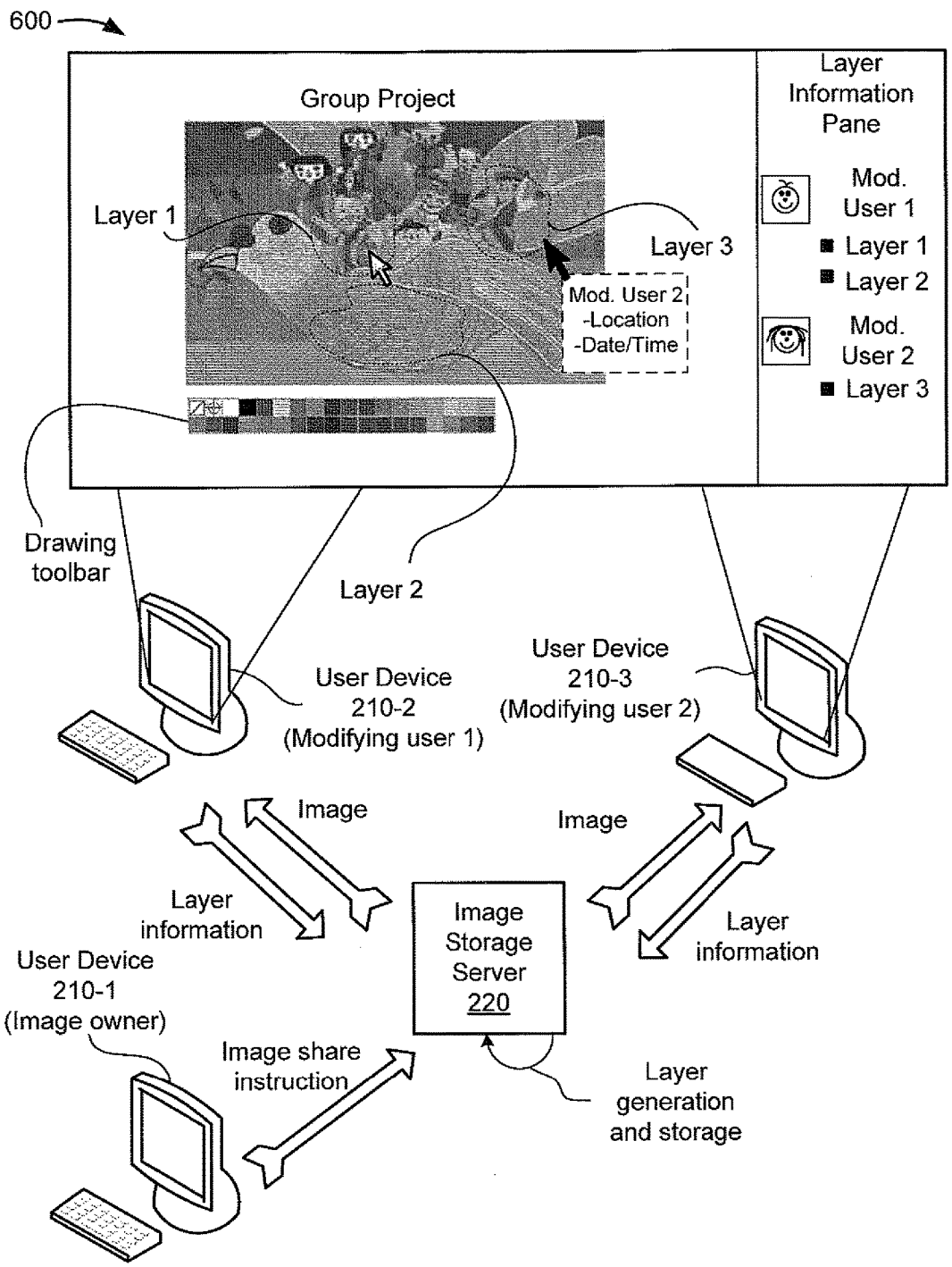
FIGS. 6A-6B illustrate an example implementation as described herein.
Figure 6B:
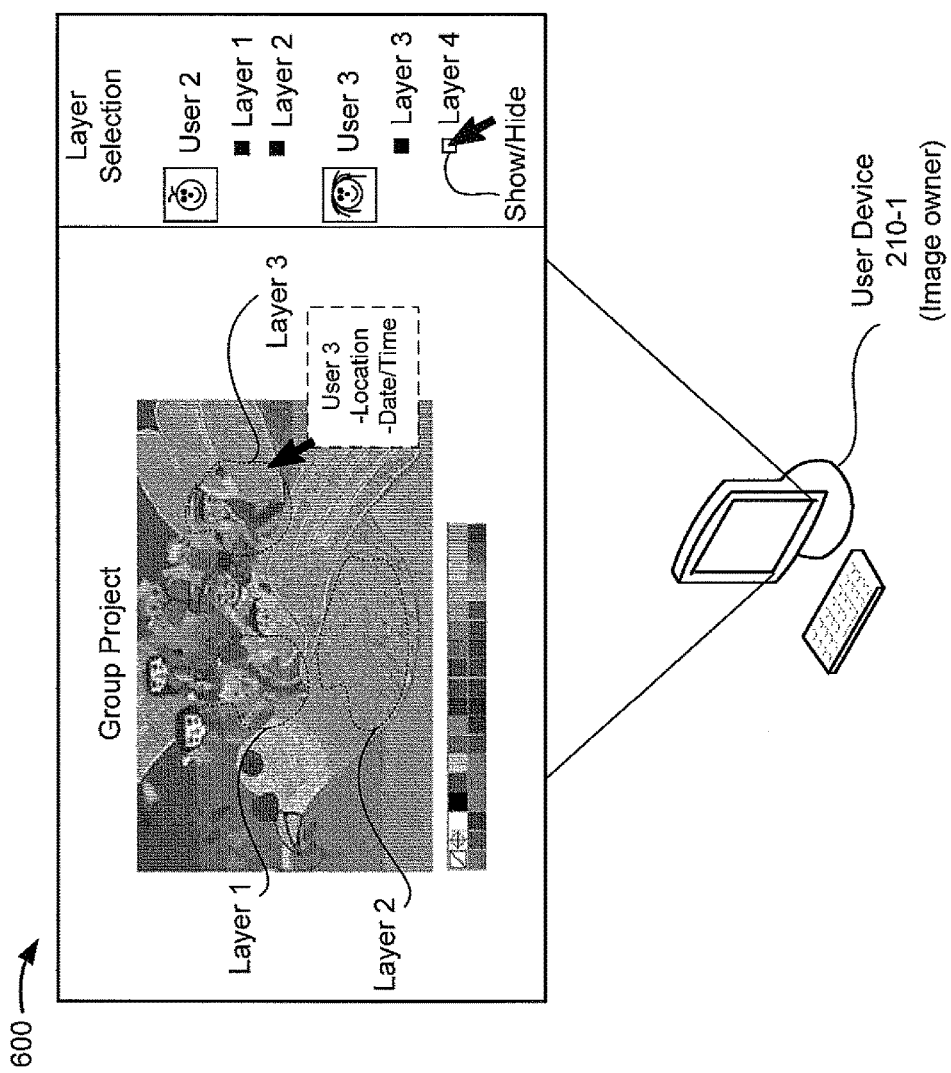

FIGS. 6A-6B illustrate an example implementation as described herein. FIGS. 6A-6B may correspond to an example of an interactive, real-time image modification session between multiple modifying users. As shown in FIG. 6A, an image owner's user device 210 (to be referred as user device 210-1 in FIGS. 6A-6B), may provide an image share instruction to image storage server 220. As described above, the image share instruction may include an image, information identifying modifying users that may modify the image, and information identifying a sharing mode.

In FIG. 6A, assume that the image share instruction identifies that modifying user 1 and modifying user 2 may access and modify the image. Further, assume that the image share instruction identifies a real-time sharing mode. Further, assume that modifying user 1 and modifying user 2 access the image simultaneously (e.g., via user device 210-2 and user device 210-3, respectively). Given these assumptions, user device 210-2 and user device 210-3 may present the image in interface 600 (e.g., corresponding to a web page, a chat room, an online classroom/meeting room, or the like). Further, user device 210-2 and user device 210-3 may present a drawing toolbar to permit modifying user 1 and modifying user 2 to modify the image by sketching a freehand drawing.

As shown in FIG. 6A, user device 210-2 may provide layer information corresponding to a modification to the image (e.g., a freehand sketch corresponding to layer 1) made by modifying user 1. Further, user device 210-2 may provide data for another layer (e.g., layer 2) corresponding to another modification to the image (e.g., modifying a color of a portion of the image). In some implementations, image storage server 220 may generate layers based on receiving layer information from user device 210-2 and user device 210-3. In some implementations, layers generated by image storage server 220 (e.g., based on layer information provided by user device 210-2 and user device 210-3) may be identified in interface 600. Further, attributes of the layers (e.g., a date, time, and/or location at which the modifications were made, etc.) may be identified in a layer information pane and/or when a cursor is placed over the layer. In some implementations, information identifying a modifying user (e.g., an image and/or other information identifying the modifying user) and an indication that the modifying user is associated with a particular layer may be displayed in the layer information pane and/or when the cursor is placed over the particular layer.

In some implementations, the image owner (e.g., via user device 210-1) may select to show or hide particular layers. For example, referring to FIG. 6B, interface 600 may present an option to the image owner to show or hide particular layers. In some implementations, interface 600 may present options to show/hide particular layers based on a modifying user that generated a layer. Additionally, or alternatively, interface 600 may present an option to show/hide particular layers associated with a geographic location (e.g., by allowing the user to identify the geographic location on a map, or input information identifying the geographic location, such as an address, a zip code, a city, state, or town name, etc.). Additionally, or alternatively, interface 600 may present an option to show/hide particular layers associated with a date/time at which the layer was generated (e.g., a custom range of dates, a preset range, such as the last 24 hours, etc.). Additionally, or alternatively, interface 600 may present an option to show/hide particular layers based on a type of modification associated with the layer (e.g., a freehand drawing modification, a sub-image insertion modification, etc.). In some implementations, image storage server 220 may publish an updated image corresponding to layers selected to be hidden or shown by the image owner. In some implementations, the image owner may select to show or hide layers without publishing an updated image. In some implementations, another user, aside from the image owner, may select to show or hide layers without publishing the updated image.

In some implementations, a layer may be automatically deleted after the layer has expired. For example, a layer may include an expiration time based on a user associated with the layer and/or based on another attributed associated with the layer.

While a particular example is shown in FIGS. 6A-6B, the above description is merely an example implementation. In practice, other examples are possible from what is described above in FIGS. 6A-6B. Also, while a particular format of interface 600 is shown, in practice, interface 600 may have a different format and appearance than what is shown in FIGS. 6A-6B.

Figure 7:
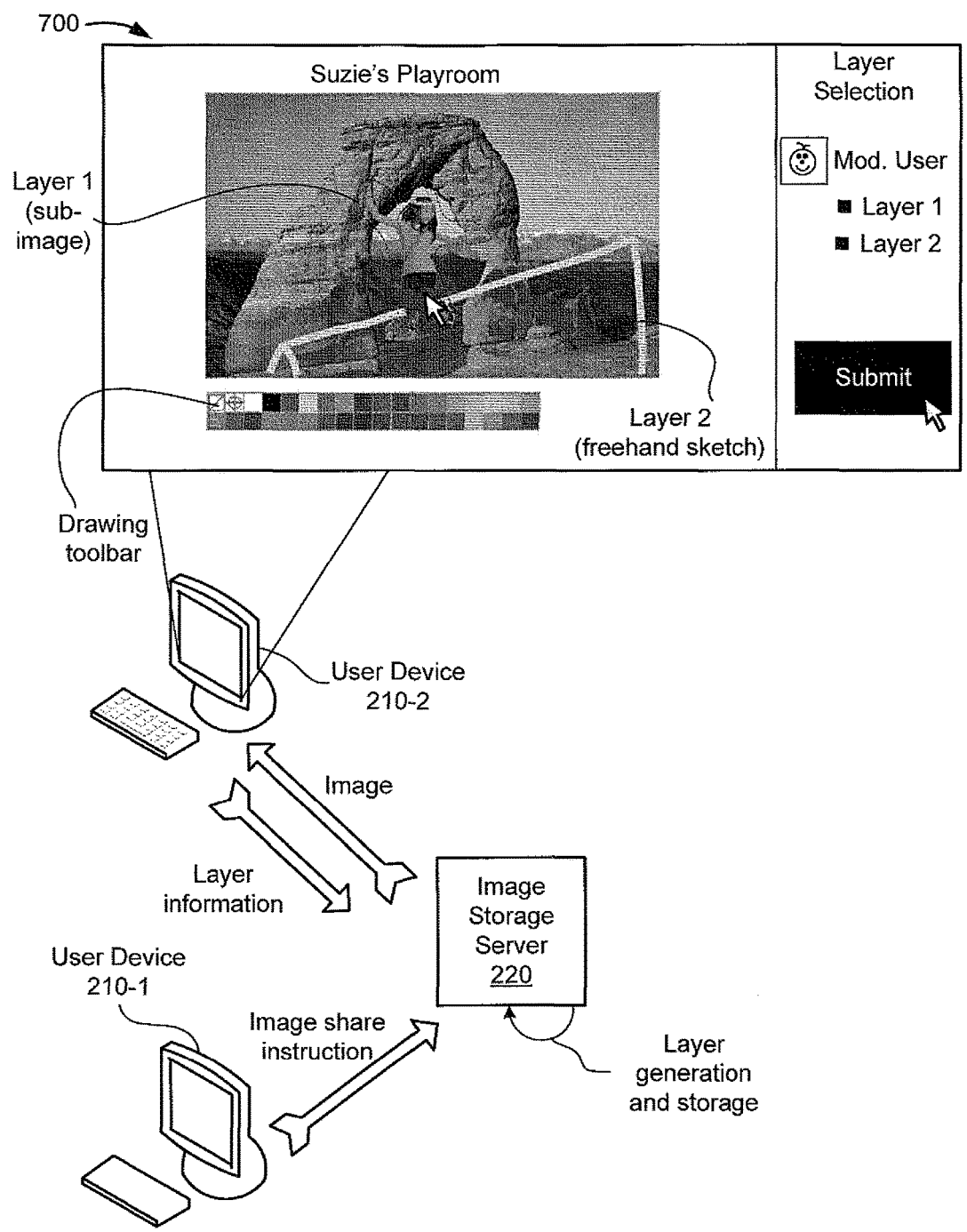
FIG. 7 illustrates an example implementation as described herein.

FIG. 7 illustrates an example implementation as described herein. As shown in FIG. 7, an image owner's user device 210 (to be referred to as user device 210-1 in FIG. 7), may provide an image share instruction to image storage server 220. As further shown in FIG. 7, a modifying user's user device 210 (to be referred to as user device 210-2 in FIG. 7), may access the image associated with the image share instruction, present the image in interface 700, and present options to permit the modifying user to modify the image to cause user device 210-2 to provide layer information, corresponding to modifications to the image. For example, as shown in interface 700, user device 210-2 may insert a sub-image and a freehand sketch.

In some implementations, user device 210-2 may receive an instruction to provide layer information, corresponding to the inserted sub-image and freehand sketch, to image storage server 220 (e.g., when the modifying user selects to provide the layer information in a layer selection pane of interface 700 as shown in FIG. 7). Based on receiving the layer information, image storage server 220 may generate layers, corresponding to the modifications to the image, and store the layers. Further, image storage server 220 may publish an update image that includes the layers (e.g., based on receiving an instruction to publish the image from user device 210-1, or independently of receiving the instruction).

While a particular example is shown in FIG. 7, the above description is merely an example implementation. In practice, other examples are possible from what is described above in FIG. 7. Also, while a particular format of interface 700 is shown, in practice, interface 700 may have a different format and appearance than what is shown in FIG. 7.

Figure 8A:
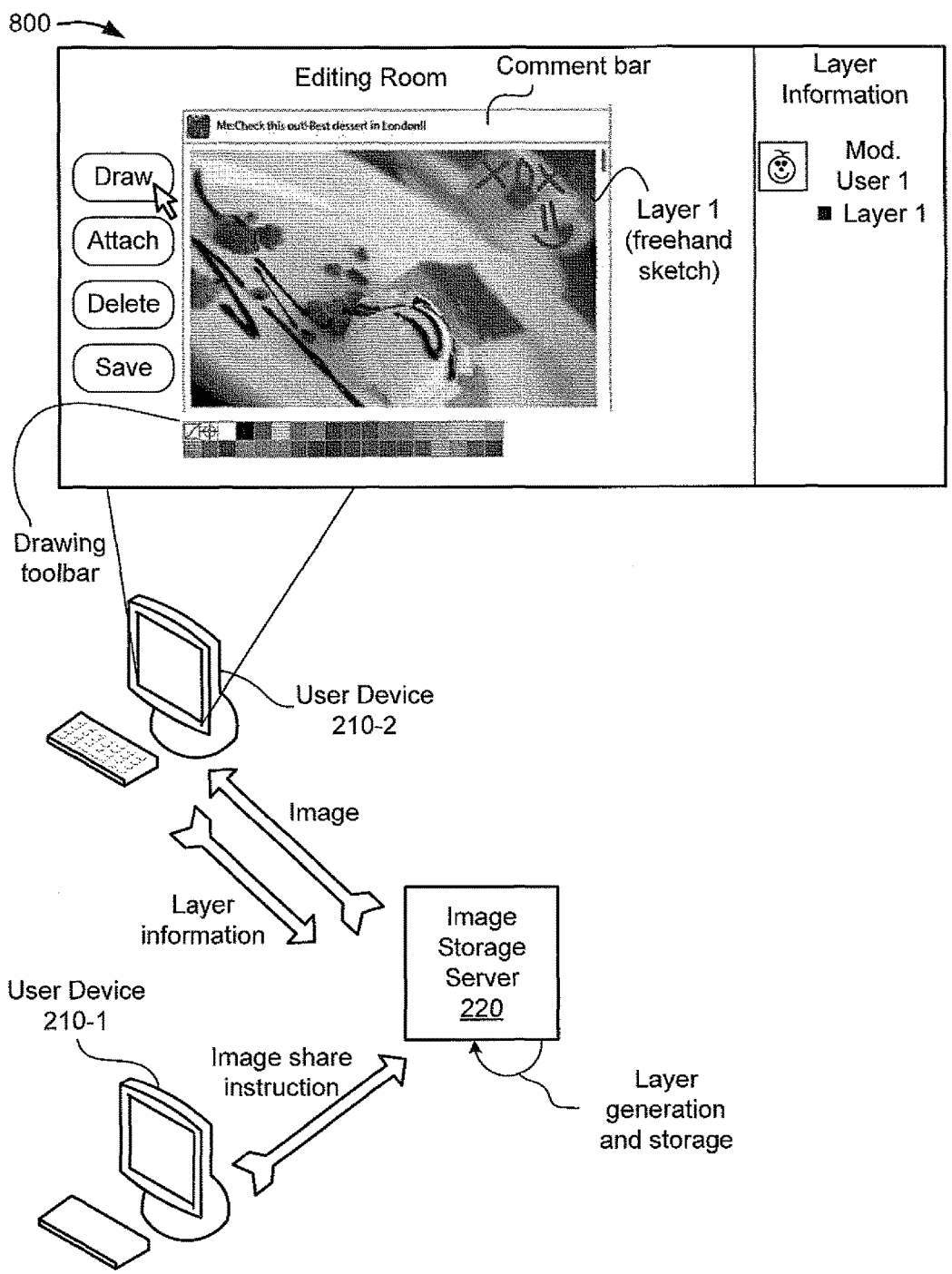
FIGS. 8A-8B illustrate an example implementation as described herein.
Figure 8B:
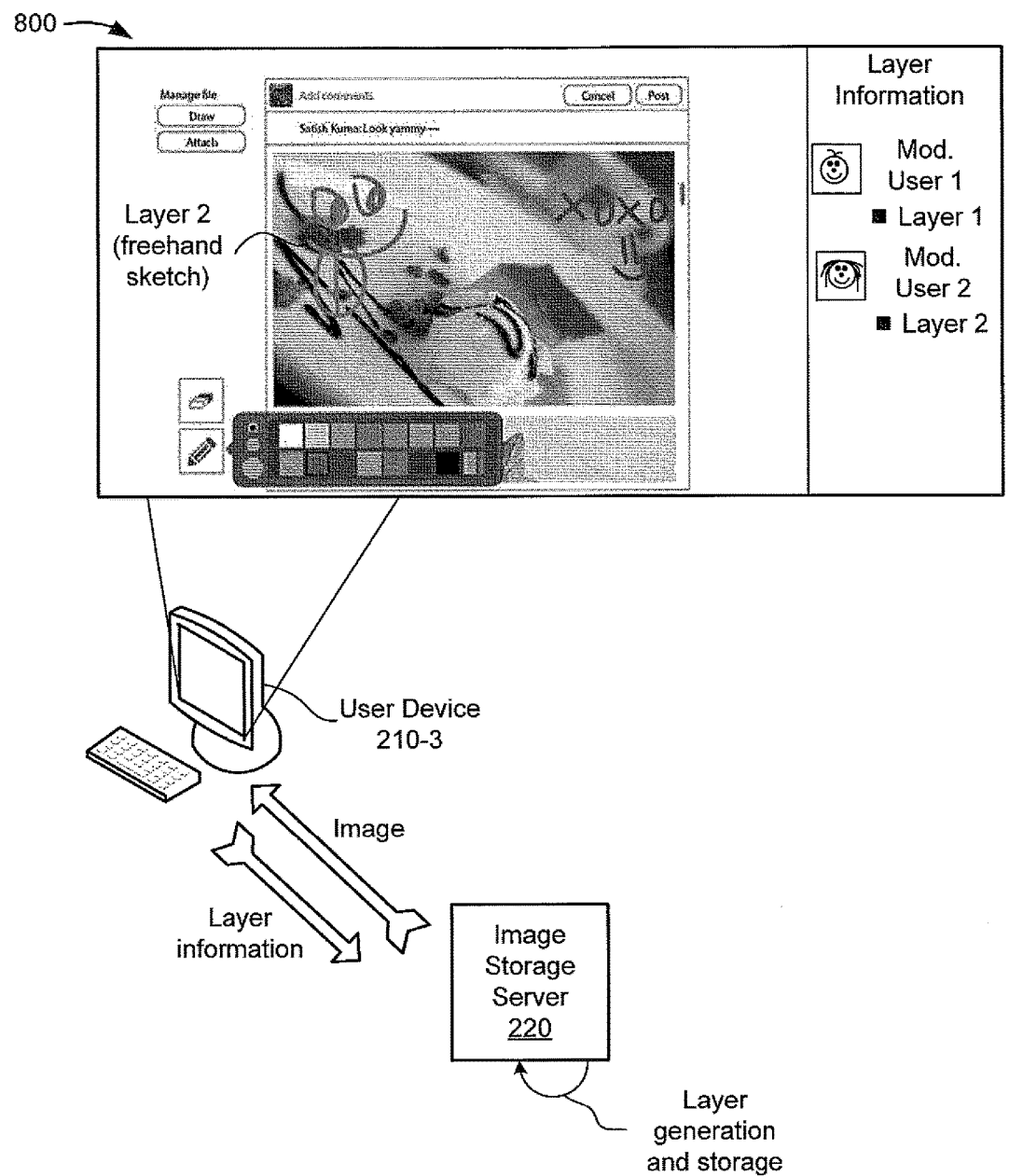

FIGS. 8A-8B illustrate an example implementation as described herein. As shown in FIG. 8A, an image owner's user device 210 (to be referred to as user device 210-1 in FIGS. 8A-8B), may provide an image share instruction to image storage server 220. As further shown in FIG. 8A, a first modifying user's user device 210 (to be referred to as user device 210-2 in FIGS. 8A-8B), may access the image associated with the image share instruction, present the image in interface 800, and present options to permit the modifying user to modify the image to cause user device 210-2 to provide layer information, corresponding to modifications to the image. For example, as shown in interface 800, user device 210-2 may present options to draw a freehand sketch, attach a sub-image, delete a previously generated layer, and save modifications made to the image. In some implementations, interface 800 may include a comment bar to permit user device 210-2 to add a narrative to the image. In some implementations, user device 210-2 may provide layer information corresponding to a modification made to the image (e.g., a freehand sketch). In some implementations, image storage server 220 may generate a layer based on the layer information (e.g., layer 1 corresponding to the freehand sketch), store the layer, and publish an updated image that includes the generated layer.

At a later time, a second modifying user's user device 210 (to be referred to as user device 210-3), may access the published image (e.g., including the modification) and may provide layer information corresponding to an additional modification to the image. For example, referring to FIG. 8B, user device 210-3 may provide layer information corresponding to another freehand sketch made by the second modifying user. In some implementations, image storage server 220 may notify user device 210-1 and/or user device 210-2 when an updated image has been published.

While a particular example is shown in FIGS. 8A-8B, the above description is merely an example implementation. In practice, other examples are possible from what is described above in FIGS. 8A-8B. Also, while a particular format of interface 800 is shown, in practice, interface 800 may have a different format and appearance than what is shown in FIGS. 8A-8B.

As described above, multiple modifying users, (e.g., via respective user devices 210) may access an image simultaneously to modify the image in an interactive manner (e.g., when an image share instruction specifies a real-time sharing mode), such that modifications made by the first modifying user are visible to a second modifying user in real-time (e.g., as modifications are being made by the first user). Additionally, or alternatively (e.g., when the image share instruction specifies a single-user sharing mode), the first modifying user and the second modifying user may modify the image separately (e.g., access the image at different times, or modify multiple separate instances of the same image).

In some implementations, an image owner may hide or delete particular layers. In some implementations, a layer may include attributes that identify a modifying user associated with the layer (e.g., a modifying user that made the modifications corresponding to the layer), a date and/or time in which the modifications were made, a geographic location at which the modifications were made, etc. As a result, multiple users may interact with an image, and modifications to the image may be stored as layers that can be hidden, deleted, or restored without modifying data in the image itself. Further, the layers may identify particular users that made particular modifications.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a server and from a first user device, information corresponding to an image to be modified;
   receiving, by the server, a sharing instruction for the image,
     the sharing instruction including:
       information identifying a portion of the image that is permitted to be modified by a second user and a third user,
       information identifying modification techniques that are permitted to be used to modify the image,
         the modification techniques including at least one of:
           free-hand sketches,
           sub-image insertions,
           animations,
           audio insertion,
           video insertion,
           text insertion, or
           file insertions, and
       information identifying a priority level for each modifying user,
         the priority level providing higher priority modifying users with access to the image prior to lower priority modifying users;
   providing, by the server and to multiple modifying user devices, an alert that the image is available to be accessed,
     the alert being provided by at least one of:
       email,
       short message service (SMS) text message, or
       a user providing login credentials for a web page or electronic photo album associated with the image;
   permitting, by the server, a second user device, associated with the second user, to access the image;
   permitting, by the server, a third user device, associated with the third user, to access the image simultaneously with the second user device;
   receiving, by the server, information corresponding to a first modification to the image by the second user device during the simultaneous access to the image;
   generating, by the server, a first layer that includes the first modification to the image,
     the first modification being associated with the second user device;
   generating, by the server, a blank layer,
     the blank layer serving as a placeholder for modifications, and
     the blank layer being assigned to at least one particular modifying user;
   storing, by the server, the first layer in association with the image and the second user;
   storing, by the server, the blank layer in association with the image;
   receiving, by the server, information corresponding to a second modification to the image by the third user device during the simultaneous access to the image;
   generating, by the server, a second layer that includes the second modification,
     the second modification being associated with the third user device;
   storing, by the server, the second layer in association with the image and the third user device;
   providing, by the server and to the first user device, a user interface for allowing the first user device to merge the first layer with the second layer; and
   publishing, by the server, the image with the merged layers to produce an updated image.

2. The method of claim 1, further comprising:
setting an expiration time for the first layer; and
deleting the first layer after the expiration time.

3. The method of claim 1, further comprising:
providing the second user device with information identifying a first user when the second user device accesses the image.

4. The method of claim 1, where attributes of the merged layers are published with the updated image,
the attributes relating to:
information associated with a time or geographic location at which the second user device provided the information corresponding to the first modification to the image, and
information associated with a time or geographic location at which the third user device provided the information corresponding to the second modification to the image.

5. The method of claim 1, further comprising:
receiving an instruction to hide the first layer to cause the first user device to display the image without displaying the first layer.

6. A system comprising:
a server including:
a memory to store instructions; and
one or more processors to execute the instructions to:
receive from a first user of a first user device, information corresponding to an image to be modified;
receive a sharing instruction,
the sharing instruction being received from the first user of the first user device,
the sharing instruction including:
an image and information identifying one or more users that are permitted to modify the image,
information identifying a portion of the image that is permitted to be modified by a second user and a third user,
information identifying modification techniques that are permitted to be used to modify the image,
the modification techniques including at least one of:
free-hand sketches,
sub-image insertions,
animations,
audio insertion,
video insertion,
text insertion, or
file insertions, and
information identifying a priority level for the one or more users that are permitted to modify the image,
the priority level providing higher priority modifying users with access to the image prior to lower priority modifying users;
provide to multiple modifying user devices an alert that the image is available to be accessed,
the alert being provided by at least one of:
email,
short message service (SMS) text message, or
a user providing login credentials for a web page or electronic photo album associated with the image;
receive information corresponding to a first modification to the image made by the second user of the one or more users;
generate a first layer that includes the first modification to the image;
generate a blank layer,
the blank layer serving as a placeholder for modifications, and
the blank layer being assigned to at least one particular modifying user;
store the first layer and the blank layer;
provide to the second user of the one or more users and the third user of the one or more users simultaneous access to the image;
receive information corresponding to a second modification to the image by the third user of the one or more users during the simultaneous access to the image;
generate a second layer that includes the second modification;
store the second layer in association with the image and the third user of the one or more users;
provide to the first user, a user interface for allowing the first user to merge the first layer with the second layer; and
publish the image with the merged layers to produce an updated image.

7. The system of claim 6, where the one or more processors are further to:
provide the second user with information identifying the first user when the second user accesses the image.

8. The system of claim 6, where the one or more processors are further to:
set an expiration time for the first layer; and
delete the first layer after the expiration time.

9. The system of claim 6, where attributes of the merged layers are published with the updated image,
the attributes of the merged layers including:
information associated with a time or geographic location at which the second user provides the information corresponding to the first modification to the image, and
information associated with a time or geographic location at which the third user provides the information corresponding to the second modification to the image.

10. The system of claim 6, where the one or more processors are further to:
receive an instruction to hide the first layer to cause first user device to display the image without displaying the first layer.

11. A non-transitory computer-readable medium for storing instructions, the instructions comprising:
a plurality of instructions which, when executed by one or more processors associated with a server, cause the one or more processors to:
provide, to multiple user devices, an alert that an image is available to be accessed,
the alert being provided by at least one of:
email,
short message service (SMS) text message, or
a user providing login credentials for a web page or electronic photo album associated with the image;
provide, to a first user device, of the multiple user devices, and to a second user device, of the multiple user devices, simultaneous access to the image;
receive, from the first user device, information corresponding to a first modification to the image made by a first user associated with the first user device;
receive, from the second user device, information corresponding to a second modification to the image by a second user associated with the second user device;
generate a first layer that includes the first modification to the image;

generate a second layer that includes the second modification to the image;
generate a blank layer,
the blank layer serving as a placeholder for modifications, and
the blank layer being assigned to at least one particular modifying user;
store the first layer, the second layer, and the blank layer;
receive a sharing instruction for the image,
the sharing instruction including:
information identifying a portion of the image that is permitted to be modified by a third user,
information identifying modification techniques that are permitted to be used to modify the image,
the modification techniques including at least one of:
free-hand sketches,
sub-image insertions,
animations,
audio insertion,
video insertion,
text insertion, or
file insertions, and
information identifying a priority level for each modifying user,
the priority level providing higher priority modifying users with access to the image prior to lower priority modifying users;
permit a third user device, associated with the third user, to access the image, the first layer, and the second layer,
the third user device being permitted to control whether the image is presented with the first layer superimposed on the image, the second layer superimposed on the image, or the first layer and the second layer superimposed on the image based on a type of modification associated with the first layer or the second layer;
provide, to the third user device, a user interface for allowing the third user device to merge the first layer with the second layer; and
publish the image with the merged layers to produce an updated image.

12. The non-transitory computer-readable medium of claim 11, where the sharing instruction includes information regarding the image and information identifying one or more users that are permitted to modify the image, and
where one or more instructions, of the plurality of instructions, to receive the information corresponding to the first modification, cause the one or more processors to:
receive the information corresponding to the first modification based on receiving the sharing instruction.

13. The non-transitory computer-readable medium of claim 11, where the plurality of instructions further cause the one or more processors to:
publish the image with the first layer or the second layer superimposed on the image to produce an updated image, and
cause the first user device, the second user device, or the third user device to:
display the updated image, information identifying the first user or the second user, and an indication that the first user or the second user is associated with the first layer or the second layer.

14. The non-transitory computer-readable medium of claim 11, where the plurality of instructions further cause the one or more processors to:
set an expiration time for the first layer; and
delete the first layer after the expiration time.

15. The non-transitory computer-readable medium of claim 11, where the plurality of instructions further cause the one or more processors to:
receive an instruction from the third user device to publish the image with the first layer or the second layer superimposed on the image based on attributes of the first layer or the second layer,
the attributes of the first layer or the second layer including a time or geographic location at which the first user device or the second user device provides the information corresponding to the first modification or the second modification to the image; and
publish the image with the first layer or the second layer superimposed on the image based on receiving the instruction from the third user device to publish the image.

16. The non-transitory computer-readable medium of claim 11, where the plurality of instructions further cause the one or more processors to:
receive an instruction to hide the first layer or second layer, to cause the third user device to display the image without displaying the first layer or the second layer.

17. The method of claim 1, further comprising:
receiving an instruction from the first user device to disable access of the second user device to the image.

18. The method of claim 1, where the updated image is published in one of:
a web page,
an electronic photo album,
an interactive chat room,
an online classroom, or
an online meeting room.

19. The system of claim 6, where the updated image is published in one of:
a web page,
an electronic photo album,
an interactive chat room,
an online classroom, or
an online meeting room.

20. The system of claim 6, where the one or more processors are further to:
receive an instruction from the first user device to disable access of the second user to the image.

* * * * *